United States Patent
Imran et al.

(10) Patent No.: US 9,017,821 B2
(45) Date of Patent: Apr. 28, 2015

(54) COATED ARTICLE WITH LOW-E COATING HAVING MULTILAYER OVERCOAT AND METHOD OF MAKING SAME

(75) Inventors: Muhammad Imran, Brownstown, MI (US); Francis Wuillaume, Victor, NY (US); Brent Boyce, Novi, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 63 days.

(21) Appl. No.: 13/401,948

(22) Filed: Feb. 22, 2012

(65) Prior Publication Data

US 2013/0216860 A1    Aug. 22, 2013

(51) Int. Cl.
| | | |
|---|---|---|
| B32B 15/04 | (2006.01) | |
| B32B 17/06 | (2006.01) | |
| C03C 17/36 | (2006.01) | |

(52) U.S. Cl.
CPC ........... *C03C 17/366* (2013.01); *C03C 17/3618* (2013.01); *C03C 17/3626* (2013.01); *C03C 17/3644* (2013.01); *C03C 17/3652* (2013.01); *C03C 17/3681* (2013.01); *C03C 2217/78* (2013.01); *C03C 2218/322* (2013.01); *Y10T 428/12549* (2015.01); *Y10T 428/265* (2015.01)

(58) Field of Classification Search
CPC .......... B32B 9/00; B32B 15/00; B32B 15/04; B32B 17/00; B32B 17/06; B32B 2255/06; B32B 2255/205; B32B 2255/28; B32B 2255/00; C03C 15/00; C03C 17/00; C03C 17/06; C03C 17/23; C03C 17/3411; C03C 17/34; C03C 17/36; C03C 17/3602; C03C 17/3604; C03C 17/3607; C03C 17/361; C03C 17/3613; C03C 17/3615; C03C 17/3639; C03C 17/3642; C03C 17/3657; C03C 17/366; C03C 17/3681
USPC ......... 428/426, 432, 433, 434, 688, 689, 699, 428/701, 702
See application file for complete search history.

(56) References Cited

U.S. PATENT DOCUMENTS

| | | |
|---|---|---|
| 5,563,734 A | 10/1996 | Wolfe et al. |
| 6,686,050 B2 | 2/2004 | Lingle et al. |
| 6,749,941 B2 | 6/2004 | Lingle |

(Continued)

FOREIGN PATENT DOCUMENTS

| | | |
|---|---|---|
| EP | 0 622 645 | 11/1994 |
| WO | WO 2006/124503 | 11/2006 |

(Continued)

OTHER PUBLICATIONS

U.S. Appl. No. 13/064,064, filed Mar. 3, 2011; Imran et al.

(Continued)

*Primary Examiner* — David Sample
*Assistant Examiner* — Lauren Colgan
(74) *Attorney, Agent, or Firm* — Nixon & Vanderhye P.C.

(57) ABSTRACT

A coated article is provided so as to include a low-E (low emissivity) coating having an infrared (IR) reflecting layer(s) of or including a material such as silver (Ag), which is provided between a pair of contact layers. The low-E coating includes an overcoat having at least one layer of or including zirconium oxide and/or a substantially metallic layer. The overcoat has been found to improve the durability of the coating without significantly sacrificing desired optical characteristics. Such coated articles may be used in the context of windows.

28 Claims, 3 Drawing Sheets

(56) References Cited

U.S. PATENT DOCUMENTS

| | | |
|---|---|---|
| 6,852,419 B2 | 2/2005 | Stachowiak |
| 6,863,928 B2 | 3/2005 | Stachowiak |
| 6,890,659 B2 | 5/2005 | Stachowiak |
| 6,908,679 B2 | 6/2005 | Stachowiak et al. |
| 6,967,060 B2 | 11/2005 | Stachowiak |
| 6,974,630 B1 | 12/2005 | Stachowiak |
| 7,147,924 B2 | 12/2006 | Stachowiak |
| 7,153,578 B2 | 12/2006 | Chonlamaitri et al. |
| 7,166,359 B2 | 1/2007 | Kriltz et al. |
| 7,390,572 B2 | 6/2008 | Butz et al. |
| 7,462,398 B2 | 12/2008 | Lemmer et al. |
| 7,534,496 B2 | 5/2009 | Lemmer et al. |
| 7,592,068 B2 | 9/2009 | Disteldorf et al. |
| 7,597,962 B2 | 10/2009 | Butz et al. |
| 7,597,963 B2 | 10/2009 | Corsner et al. |
| 7,655,313 B2 | 2/2010 | Blacker et al. |
| 7,771,830 B2 | 8/2010 | Neuman et al. |
| 7,858,191 B2 | 12/2010 | Lemmer et al. |
| 7,879,448 B2 | 2/2011 | Dietrich et al. |
| 7,897,260 B2 | 3/2011 | Nunez-Regueiro et al. |
| 7,998,320 B2 | 8/2011 | Laird et al. |
| 8,017,243 B2 | 9/2011 | Blacker et al. |
| 2004/0224167 A1* | 11/2004 | Stachowiak .................. 428/432 |
| 2005/0069717 A1 | 3/2005 | Stachowiak |
| 2006/0159933 A1 | 7/2006 | Disteldorf et al. |
| 2007/0281171 A1* | 12/2007 | Coster et al. ................. 428/432 |
| 2008/0011408 A1* | 1/2008 | Maschwitz ..................... 156/99 |
| 2008/0038148 A1 | 2/2008 | Crook |
| 2008/0311389 A1* | 12/2008 | Roquiny et al. .............. 428/336 |
| 2009/0004043 A1 | 1/2009 | Tawancy |
| 2009/0324967 A1 | 12/2009 | Disteldorf et al. |
| 2010/0062245 A1* | 3/2010 | Martin et al. ................. 428/336 |
| 2010/0221575 A1 | 9/2010 | Stull |
| 2011/0261442 A1* | 10/2011 | Knoll et al. ................... 359/360 |
| 2011/0262726 A1 | 10/2011 | Knoll et al. |

FOREIGN PATENT DOCUMENTS

| | | |
|---|---|---|
| WO | WO 2009/157970 | 12/2009 |
| WO | WO 2012/118469 | 9/2012 |

OTHER PUBLICATIONS

U.S. Appl. No. 13/064,062, filed Mar. 3, 2011; Imran et al.

U.S. Appl. No. 13/401,988, filed Feb. 22, 2012; Imran et al.

* cited by examiner

COATED ARTICLE WITH LOW-E COATING HAVING MULTILAYER OVERCOAT AND METHOD OF MAKING SAME

This invention relates to coated articles that include a low-E (low emissivity) coating and a multilayer overcoat having at least two spaced apart layers of or including zirconium oxide. In certain example embodiments the low-E coating may include at least one infrared (IR) reflecting layer of a material such as silver, and the overcoat provided over the IR reflecting layer may include two spaced apart layers of or including zirconium oxide, the two zirconium oxide inclusive layers being spaced apart by at least one dielectric layer. Such coated articles may be used in the context of monolithic windows, insulating glass (IG) window units, laminated windows, and/or other suitable applications.

BACKGROUND AND SUMMARY OF THE INVENTION

Coated articles having low-E coatings are known in the art. For example, see the following U.S. Patent Documents which describe low-E coatings and which are all incorporated herein by reference in their entireties: U.S. Pat. Nos. 6,686,050, 6,749,941, 6,863,928, 7,166,359, 7,390,572, 7,462,398, 7,534,496, 7,597,962, 7,597,963, 7,655,313, 7,771,830, 7,858,191, 7,879,448, 7,897,260, 7,998,320, and 8,017,243. A low-E coating is for the purpose of providing efficient solar control in applications such as windows, and includes at least one IR reflecting layer sandwiched between two contact layers. The contact layers which sandwich an IR reflecting layer therebetween are sometimes referred to as barrier layers. The contact layer directly below and contacting an IR reflecting layer is often of a material such as ZnO, NiCr, or $NiCrO_x$, and the contact layer directly over and contacting an IR reflecting layer is often of a material such as NiCr or $NiCrO_x$. The contact/barrier layer provided directly over and contacting an IR reflecting layer is for protecting the IR reflecting layer from aggressive environments during sputtering of overlying layers as well as during the lifetime of the coating, and for providing adhesion between the IR reflecting layer and an overlying dielectric layer. However, in order to meet typically desired transmission and optical requirements of low-E coatings, the contact layer provided over an IR reflecting layer generally needs to be very thin. Thin upper contact/barrier layers can often provide sufficient durability when the coating is used in the interior of an insulating glass (IG) window unit where the coating is not directly exposed to the environment. However, for monolithic applications where the coating is directly exposed to the environment (either directly exposed to the interior of a building or home, or directly exposed to the exterior atmosphere), a thin upper contact/barrier layer is sometimes not sufficient by itself to protect the IR reflecting layer (e.g., silver layer) against environmental attacks.

Thus, while conventional low-E coatings provide efficient solar control and are overall good coatings, they are sometimes lacking in terms of one or more of: (a) corrosion resistance to acid and/or alkaline solutions (e.g., 80% HCl boil test and/or 20% NaOH boil test); (b) mechanical performance such as scratch resistance; and/or (c) durability. Accordingly, there exists a need in the art for a coated article that includes a low-E coating and which has improved durability characteristics, but which still is capable of acceptable thermal performance (e.g., blocking a reasonable amount of IR radiation) and/or heat treatment (HT). It is a purpose of this invention to fulfill at least one of the above-listed needs, and/or other needs which will become apparent to the skilled artisan once given the following disclosure.

In certain example embodiments of this invention, an improved overcoat is provided for a low-E coating in order to improve its overall durability. In certain example embodiments the low-E coating may include at least one infrared (IR) reflecting layer of a material such as silver, and the overcoat for protecting the low-E coating includes two spaced apart layers of or including zirconium oxide, where the two zirconium oxide inclusive layers are spaced apart by at least one dielectric layer. In certain example embodiments, the dielectric layer provided between the two layers comprising zirconium oxide may be of silicon oxynitride, silicon nitride, silicon oxide, and/or the like. In certain example embodiments, the two zirconium oxide inclusive layers of the overcoat are not in contact with any metallic or substantially metallic IR reflecting layer (e.g., is not in contact with any Ag-based or Au-based layer). In certain example embodiments, the two zirconium oxide (e.g., $ZrO_2$) inclusive layers of the overcoat are dielectric layers. In certain example embodiments, in the overcoat, one of the layers comprising zirconium oxide (e.g., $ZrO_2$) may be the uppermost layer of the coating relative to the underlying substrate that supports the coating. It has surprisingly been found that such an overcoat improves the durability of the coating in terms of protection of the IR reflecting layer(s) from chemicals, scratches, scratch corrosion, fingerprint corrosion, environmental damage and mechanical damage. Such coated articles may be used in the context of monolithic windows, insulating glass (IG) window units, laminated windows, and/or other suitable applications.

The coated article may or may not be heat treated (e.g., thermally tempered) in different embodiments of this invention. The heat treatment (HT) may be for at least about 5 minutes at a temperature(s) of at least about 580 degrees C., so as to be sufficient for thermal tempering or the like. It has surprisingly been found that such an overcoat discussed herein improves the durability of the coating in terms of protection of the IR reflecting layer(s) from chemicals, scratches, scratch corrosion, fingerprint corrosion, environmental damage and mechanical damage, for the coating both before and after any optional HT.

In certain example embodiments of this invention, there is provided a coated article including a layer system supported by a glass substrate, the layer system comprising: a first dielectric layer on the glass substrate; an IR reflecting layer comprising silver on the glass substrate over at least the first dielectric layer; a contact layer on the glass substrate over and directly contacting the IR reflecting layer; a first layer comprising zirconium oxide on the glass substrate over at least the contact layer; a second dielectric layer on the glass substrate over the first layer comprising zirconium oxide; and a second layer comprising zirconium oxide on the glass substrate over at least the second dielectric layer, wherein the second dielectric layer directly contacts one or both of the first and second layers comprising zirconium oxide.

In certain example embodiments of this invention, there is provided a coated article including a layer system supported by a glass substrate, the layer system comprising: a first dielectric layer on the glass substrate; an infrared (IR) reflecting layer comprising silver on the glass substrate over at least the first dielectric layer; a contact layer on the glass substrate over and directly contacting the IR reflecting layer; a layer comprising NbZr on the glass substrate over at least the contact layer; and an overcoat comprising first and second spaced apart layers comprising zirconium oxide on the glass substrate over at least the layer comprising NbZr.

IN THE DRAWINGS

DETAILED DESCRIPTION OF CERTAIN EXAMPLE EMBODIMENTS OF THE INVENTION

Figure 1:
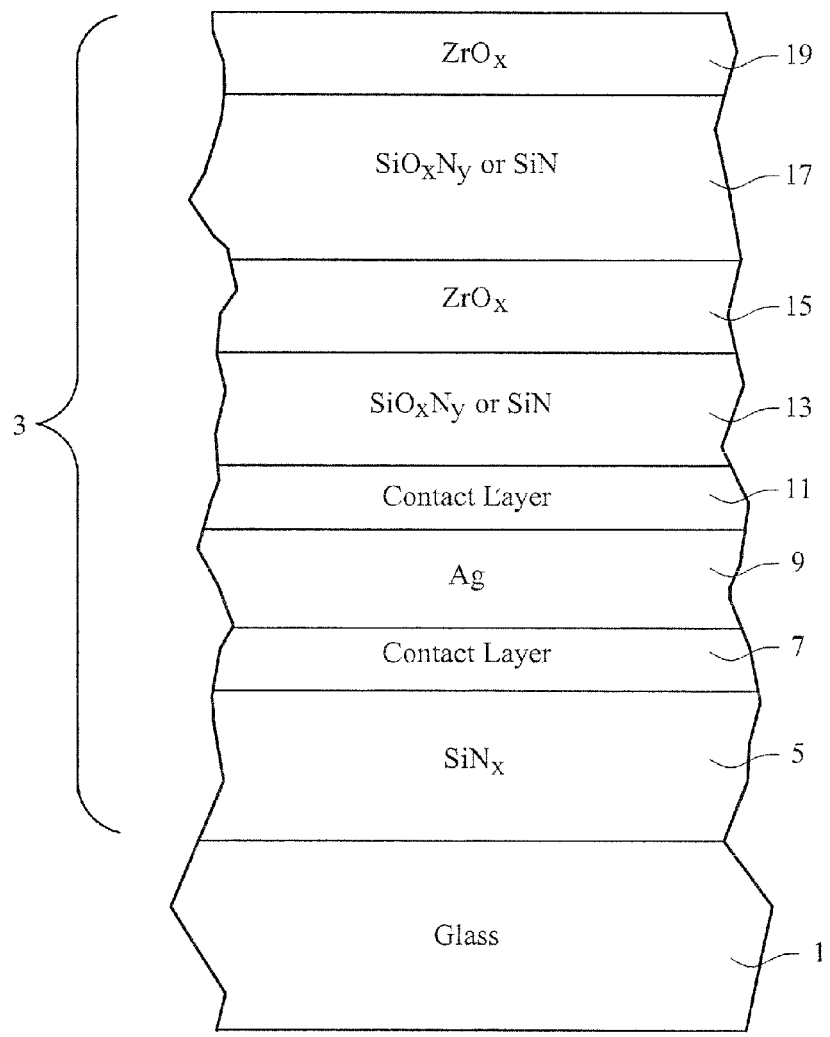
FIG. 1 is a partial cross sectional view of an embodiment of a monolithic coated article (heat treated or not heat treated) according to an example embodiment of this invention.

Referring now more particularly to the accompanying drawings in which like reference numerals indicate like parts throughout the several views.

Certain embodiments of this invention provide coated articles that may be used in windows such as monolithic windows (e.g., vehicle, residential, and/or architectural windows), IG window units, laminated windows, storm door windows, skylights, transparent freezer doors, and/or other suitable applications.

A multilayer overcoat is provided for a low-E coating in order to improve its overall durability. In certain example embodiments the low-E coating may include at least one infrared (IR) reflecting layer 9 of a material such as silver, and the overcoat for protecting the low-E coating includes two spaced apart layers 15, 19 of or including zirconium oxide, where the two zirconium oxide inclusive layers 15, 19 are spaced apart by at least one dielectric layer 17. In certain example embodiments, the dielectric layer 17 provided between the two layers 15, 19 of or including zirconium oxide may be of silicon oxynitride, silicon nitride, silicon oxide, and/or the like. In certain example embodiments, the two zirconium oxide inclusive layers 15, 19 of the overcoat are not in contact with any metallic or substantially metallic IR reflecting layer (e.g., is not in contact with any Ag-based or Au-based layer 9). In certain example embodiments, the two zirconium oxide (e.g., $ZrO_2$) inclusive layers 15, 19 of the overcoat are dielectric layers.

It has surprisingly been found that such a multilayer overcoat improves the durability of the coating, before and after any optional heat treatment such as thermal tempering, in terms of protection of the IR reflecting layer(s) 9 from chemicals, scratches, scratch corrosion, fingerprint corrosion, environmental damage and mechanical damage. Such coated articles may be used in the context of monolithic windows, insulating glass (IG) window units, laminated windows, and/or other suitable applications. The multilayer overcoat is able to provide improved durability for the coating while at the same time not significantly sacrificing desired optical characteristics. For example, along with improved durability, the coated article is able to achieve desired visible transmission, desired optical characteristics such as color and transmission, good IR reflectance/blocking, and good color stability upon heat treatment (HT) in certain example embodiments of this invention.

Coated articles according to preferred embodiments of this invention have a visible transmission, before and/or after optional HT, of at least about 30%, more preferably of at least about 40%, with example visible transmission ranges being from about 40-70%, more preferably from about 45-65%. Coated articles according to preferred embodiments of this invention have a sheet resistance ($R_s$), before and/or after optional HT, of less than about 40 ohms/square, more preferably less than about 30 ohms/square, and most preferably less than about 25 or 15 ohms/square.

FIG. 1 illustrates a coated article according to an example embodiment of this invention. The coated article in FIG. 1 includes glass substrate 1 (e.g., clear, green, bronze, or blue-green glass substrate from about 1.0 to 10.0 mm thick, more preferably from about 1.0 mm to 6.0 mm thick), and a multi-layer coating 3 (or layer system) provided on the substrate 1 either directly or indirectly. As shown in FIG. 1, the coating 3 includes dielectric layer 5, lower contact layer 7 (e.g., of or including Ni. Cr, NiCr and/or $NiCr_x$), IR reflecting layer 9 of or including silver, gold, or the like, upper contact/barrier layer 11 (e.g., of or including Ni, Cr, NiCr and/or $NiCrO_x$), dielectric layer 13 (e.g., of or including silicon oxynitride, silicon nitride and/or silicon oxide), dielectric layer 15 of or including zirconium oxide (e.g., $ZrO_2$), dielectric layer 17 (e.g., of or including silicon oxynitride, silicon nitride and/or silicon oxide), and top or uppermost dielectric layer 19 of or zirconium oxide (e.g., $ZrO_2$). Layers such as dielectric layer 17 may be made up of multiple layers in certain example embodiments of this invention. The overcoat may be said to be made up of layers 15, 17 and 19, or alternatively may be said to be made up of layers 13, 15, 17 and 19 in different example instances. The optional NbZr based layer discussed below, for example between layers 11 and 13 or alternatively taking the place of layer 13, may also be considered part of the overcoat. No IR reflecting layer (i.e., no Ag or Au based layer) is provided over the overcoat. Silicon oxynitride, silicon nitride, and silicon oxide layers discussed herein (e.g., see layers 5, 13, and 17) may be doped (e.g., from about 0.1 to 12%) with aluminum in certain example embodiments of this invention, and zirconium oxide layers discussed herein (e.g., see layers 15 and 19) may also be doped (e.g., from about 0.1 to 12%) with aluminum in certain example embodiments of this invention. The layers 15, 19 of or including an oxide of Zr may also include at least one of Ti, Al and Mo in certain example embodiments. Zirconium oxide based layers discussed herein (e.g., see layers 15 and 19) may be fully oxided, or substantially fully oxided, in certain example embodiments of this invention. Other layers and/or materials may also be provided in certain example embodiments of this invention, and it is also possible that certain layers may be removed or split in certain example instances.

Figure 2:
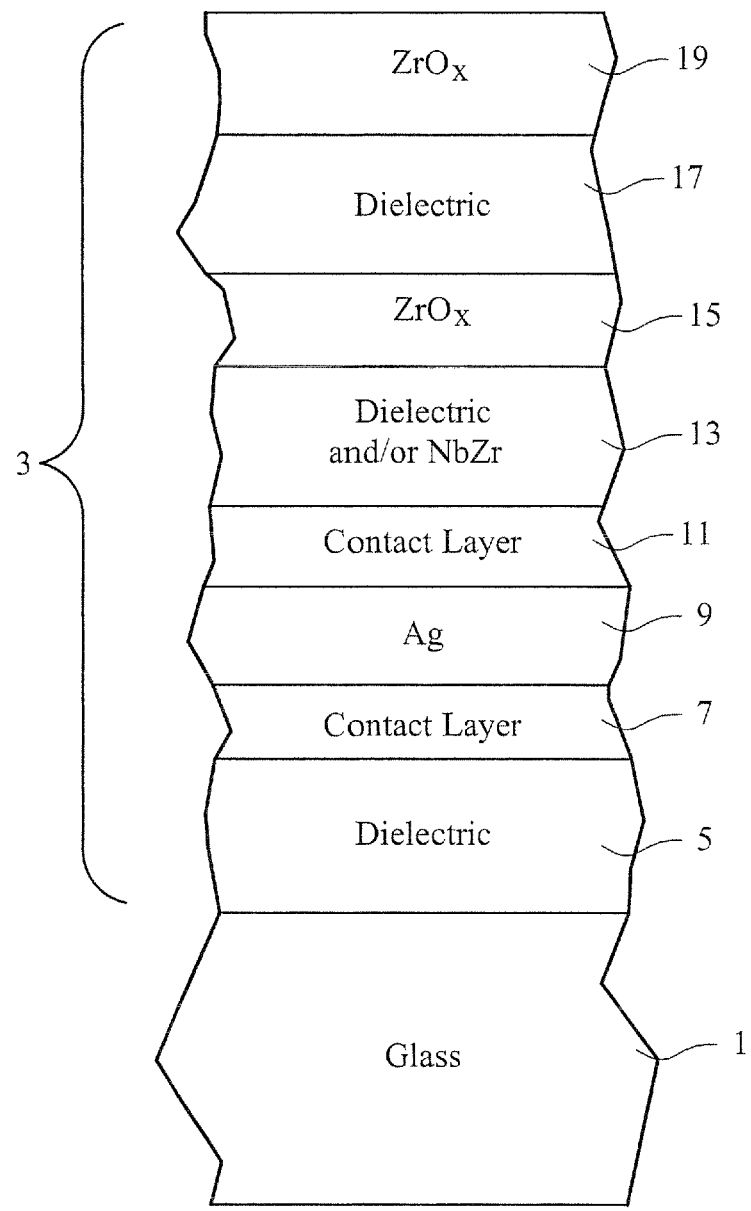
FIG. 2 is a partial cross sectional view of an embodiment of a monolithic coated article (heat treated or not heat treated) according to an example embodiment of this invention.
Figure 3:
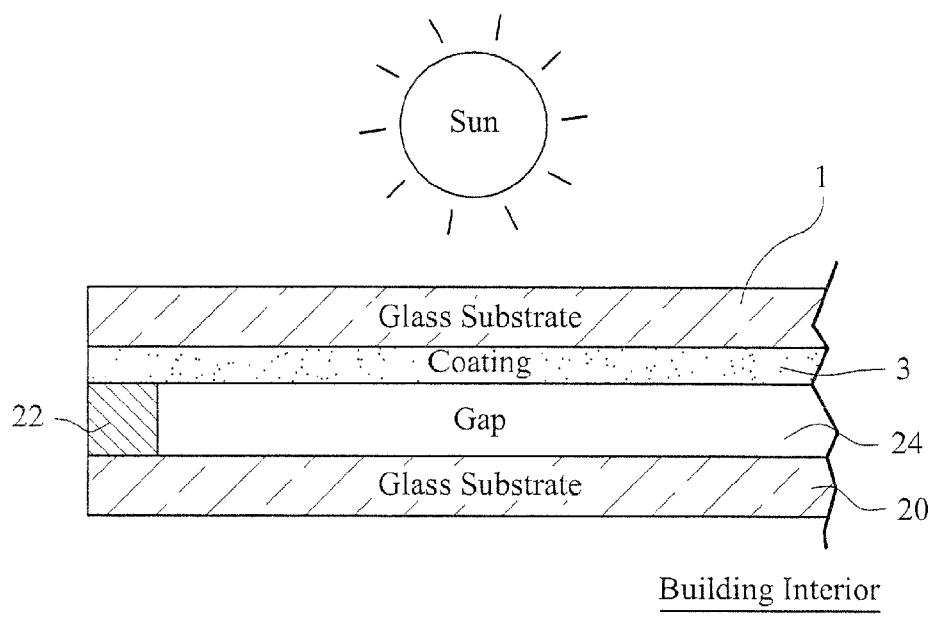
FIG. 3 is a partial cross sectional view of an IG window unit including the coating of FIG. 1 and/or FIG. 2 according to an example embodiment of this invention.

For example, in the FIG. 1-3 embodiments, a layer of or including NbZr (not shown) may be provided between and contacting contact layer 11 and dielectric layer 13, in order to further improve durability. In FIG. 2, one meaning of "dielectric and/or NbZr" in layer 13 is that layer 13 may be made up of both a first layer of or including NbZr and a second overlying layer of or including a dielectric such as silicon nitride and/or silicon oxynitride. Alternatively, the layer of or including NbZr may instead take the place of layer 13 in certain example embodiments of this invention (i.e., in FIG. 2, it can be seen that layer 13 may instead be of or including NbZr, without any silicon nitride or silicon oxynitride). The sputter-deposited layer of or including NbZr, which may be all or part of layer 13 in FIG. 2 or an additional non-illustrated layer between layers 11 and 13 in FIG. 1, may be metallic or substantially metallic in certain example instances, and may optionally be slightly oxided. In certain example embodiments, in this NbZr based layer, the ratio of zirconium to niobium (Zr/Nb) can be from about 0.001 to 0.60, more preferably from about 0.004 to 0.50. And this layer comprising niobium zirconium can include from about 1 to 20% Zr, more preferably from about 2 to 15% Zr (atomic %), in certain example embodiments of this invention. In certain example embodiments of this invention, this optional NbZr based layer may be from about 10-100 angstroms thick, more preferably from about 10-50 angstroms thick, and most preferably from about 10-30 angstroms thick. An example thickness for this layer is about 2 nm (about 20 angstroms). This NbZr based layer is thick enough to provide improvement in durability, but is thin enough to not adversely affect the optical performance of the coated article. For example, if this layer is too thick, the visible transmission of the coated article could undesirably drop and/or the desired coloration of the coated article could no longer be realized.

Overall coating 3 includes at least layers 5-19 in the FIG. 1 embodiment, as well as the optional NbZr based layer. It is noted that the terms "oxide" and "nitride" as used herein include various stoichiometries. For example, the term silicon nitride includes stoichiometric $Si_3N_4$, as well as non-stoichiometric silicon nitride such as Si-rich type silicon nitride. Layers 5-19 may be deposited on substrate 1 via magnetron sputtering, any other type of sputtering, or via any other suitable technique in different embodiments of this invention.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating 3 to have low-E and/or good solar control characteristics such as low emittance, low sheet resistance, and so forth. The IR reflecting layer 9 may, however, be slightly oxidized in certain embodiments of this invention. In the FIG. 1 embodiment, the coating includes only one IR reflecting layer 9 of or including Ag and/or Au, but in alternative embodiments multiple such IR reflecting layers 9 may be provided as in other low-E coatings. In certain example embodiments, in IR reflecting layer(s) 9 Ag may be alloyed with Pd, Cu, or both Pd and Cu, with approximately 0.5-2% (by weight or atomic %) of each of Pd and Cu. Other potential alloys for layer(s) 9 include Ag and one or more of Co, C, Mg, Ta, W, NiMg, PdGa, CoW, Si, Ge, Au, Pt, Ru, Sn, Al, Mn, V, In, Zn, Ir, Rh, and/or Mo. In general, dopant concentrations (of the materials in addition to Ag) may be in the range of 0.2-5% (by weight or atomic %), more preferably between 0.2-2.5%. Operating within these ranges may help the silver maintain the desirable optical characteristics of the Ag-based layer 9 that otherwise might be lost by virtue of the alloying, thereby helping to maintain the overall optical characteristics of the stack while also enhancing chemical, corrosion, and/or mechanical durability. As with the other layers discussed herein, the silver based IR reflecting layer 9 may be sputter-deposited on the substrate 1.

The upper and lower contact layers 7 and 11 may be of or include Ni, Cr, NiCr and/or $NiCrO_x$ in certain example embodiments of this invention. Thus, the contact layers 7 and 11 may be metallic or substantially metallic in preferred embodiments, and may be oxided in certain instances. In certain example embodiments, upper and lower contact layers 7, 11 may be of or include nickel (Ni), chromium/chrome (Cr), a nickel alloy such as nickel chrome (NiCr), Haynes alloy, a Ni-inclusive ternary alloy such as NiCrMo, an oxide of any of these, or other suitable material(s). For example, one of these layers (e.g., layer 7) may be of or include zinc oxide instead of NiCr. The use of, for example, NiCr in these layers is for durability in certain example instances. Contact layers 7 and 11 (e.g., of or including Ni and/or Cr) may or may not be continuous in different embodiments of this invention across the entire IR reflecting layer.

In certain example embodiments, one or both of the NiCr layers 7, 11 includes from about 70-81% Ni, from about 15-19% Cr, from about 3-6% Al, and possibly from about 0-4% (or 1-4%) Fe, and may be oxided in certain example instances so that the metallic portion of the layer is characterized by these percentages. An example is 76.5% Ni, 17% Cr, 4.3% Al, and optionally about 2.2% Fe, for one or both of layers 7, 11.

In certain example embodiments, one or both of contact layers 7, 11 is of or includes a Ni-inclusive ternary alloy. In other example embodiments, the Ni-inclusive ternary alloy may further include Ti, Cr, Nb, Zr, Mo, W, Co and/or combinations thereof. The Ni-inclusive ternary allow of layer 7 and/or 11 may be of or include $Ni_xCr_yMo_z$, $Ni_xTi_yCr_z$, $Ni_xTi_yNb_z$, $Ni_xNb_yZr_z$, $Ni_xCr_yZr_z$, $Ni_xTi_yMo_z$, $Ni_xZr_yMo_z$, $Ni_xNb_yMo_z$, $Ni_xCr_yMo_z$, $Ni_xW_yCr_z$, $Ni_xW_yMo_z$, $Ni_xW_yZr_z$, $Ni_xW_yNb_z$, $Ni_xW_yTi_z$, $Ni_xCo_yMo_z$, $Ni_xCo_yCr_z$, $Ni_xCo_yMo_z$, $Ni_xCo_yZr_z$, $Ni_xCo_yNb_z$, and/or $Ni_xCo_yTi_z$. In certain instances, the Ni-inclusive ternary alloy barrier layer 7 and/or 11 (e.g., comprising materials such as nickel, chromium, and/or molybdenum, etc.) has (1) good adhesion to the IR reflecting layer; (2) good corrosion resistance to acidic and/or alkaline solutions; (3) protection during optional high temperature oxidation; and (4) good overall chemical and/or mechanical durability. In certain example embodiments, one or both of contact layers 7, 11 comprises Cr and Mo, and more particularly may be of or include 54-58 wt. % Ni, 20-22.5 wt. % Cr, and 12.5-14.5 wt. % Mo, and may be oxided in certain example instances so that the metallic portion of the layer is characterized by these percentages. In certain example embodiments, one or both of contact layers 7, 11 is of or includes a Ni-inclusive alloy of NiCr, NiTi, and/or NiCrMo, and the layers 7 and 11 may be of the same or different materials. In certain example embodiments, one or both of contact layers 7, 11 may be of or include 60-65 wt. % Ni, 12-17 wt. % Cr, and 20-25 wt. % Mo, and may be oxided in certain example instances so that the metallic portion of the layer is characterized by these percentages. In certain example embodiments of this invention, one or both contact layers 7, 11 may be of or include 63-67 wt. % Ni, 1-2 wt. % Cr, and 25-30 wt. % Mo, and may be oxided in certain example instances so that the metallic portion of the layer is characterized by these percentages.

It has advantageously been found that NiCrMo-based alloys (e.g. C22, BC1, and/or B3 Hallestoy), for use in contact layer(s) 7 and/or 11, may protect a coating including at least one silver-based layer 9 better than layers consisting essentially of NiCr in some cases. Furthermore, NiCrMo-based alloys may protect the coated article from visible damage in certain instances. It is further believed that NiCrMo of layer 11 may form an alloy with the overlying dielectric layer 13 in the coating, which may improve the performance of this layer against alkaline solutions and boiling water. This may be particularly true in embodiments where the dielectric layer 13 is silicon based.

Tables 1-3 below show the compositions of three example embodiments of NiCrMo-based alloys (e.g., C22, BC1, and B3) for use in one or both of contact layers 7, 11. Thus, one or both of contact layers 7, 11 may be of or include the following materials in Tables 1-3, may be metallic or substantially metallic, and may be oxided in certain example instances so that the metallic portion of the layer 7 and/or 11 is characterized by the percentages in Table 1, Table 2, or Table 3.

TABLE 1

Ni$_x$Cr$_y$Mo$_z$ (e.g., C22) - elemental composition by wt. %

| Element | Preferred | More Preferred | Example |
|---|---|---|---|
| Ni | 40-70% | 50-60% | 54-58% (e.g., 56%) |
| Cr | 5-40% | 10-30% | 20-22.5% |
| Mo | 5-30% | 10-20% | 12.5-14.5% |
| Fe | 0-15% | 0-10% | 1-5% (e.g., 3%) |
| W | 0-15% | 0-10% | 1-5% (e.g., 3%) |
| Co | 0-15% | 0-10% | 1-5% (e.g., 3%) |
| Si | 0-2% | 0-1% | =<0.2% (e.g., .08%) |
| Mn | 0-3% | 0-2% | =<1% (e.g., 0.5%) |
| C | 0-1% | 0-0.5% | =<0.1% (e.g., .01%) |
| V | 0-2% | 0-1% | =<1% (e.g., 0.35%) |

TABLE 2

Ni$_x$Cr$_y$Mo$_z$ (e.g., B3) - elemental composition by wt. %

| Element | Preferred | More Preferred | Example |
|---|---|---|---|
| Ni | 50-80% | 60-70% | 63-67% (e.g., 65%) |
| Cr | 0-15% | 0-5% | 1-2% (e.g., 1.5%) |
| Mo | 10-50% | 20-40% | 25-30% (e.g., 28.5%) |
| Fe | 0-10% | 0-5% | 1-4% (e.g., 3%) |
| W | 0-15% | 0-10% | 1-5% (e.g., 3%) |
| Co | 0-15% | 0-10% | 1-5% (e.g., 3%) |
| Si | 0-2% | 0-1% | =<0.2% (e.g., .1%) |
| Mn | 0-15% | 0-10% | 1-5% (e.g., 3%) |
| C | 0-1% | 0-0.5% | =<0.1% (e.g., .01%) |
| Al | 0-3% | 0-2% | =<1% (e.g., 0.5%) |
| Ti | 0-2% | 0-1% | =<0.5% (e.g., .2%) |

TABLE 3

Ni$_x$Cr$_y$Mo$_z$ (e.g., BC1) - elemental composition by wt. %

| Element | Preferred | More Preferred | Example |
|---|---|---|---|
| Ni | 50-80% | 60-70% | 60-65% (e.g., 62%) |
| Cr | 5-30% | 10-20% | 12-17% (e.g., 15%) |
| Mo | 10-40% | 15-25% | 20-25% (e.g., 22%) |
| Fe | 0-10% | 0-5% | 1-3% (e.g., 2%) |
| Si | 0-2% | 0-1% | =<0.2% (e.g., .08%) |
| Mn | 0-5% | 0-2% | =<0.5% (e.g., 0.25%) |
| C | 0-1% | 0-0.5% | =<0.1% (e.g., 0.01%) |
| Al | 0-3% | 0-2% | =<1% (e.g., 0.5%) |

Dielectric layers 5, 13 and 17 may be of or include silicon oxynitride, silicon nitride (e.g., $Si_3N_4$), and/or any other suitable material in certain example embodiments of this invention. These layers are provided for durability purposes, to protect the underlying layers, and/or for antireflective purposes. Silicon nitride or silicon oxynitride based layer 13 provides for good adhesion between the underlying IR reflecting portion 9 of the coating and the overlying protective overcoat. In certain example embodiments, dielectric layer 5 may be of or include silicon nitride, dielectric layer 13 may be of or include silicon oxynitride, and dielectric layer 17 may be of or include silicon oxynitride and/or silicon oxide. In certain example embodiments, silicon nitride based layer 5 may be silicon-rich (i.e., contains more Si than $Si_3N_4$), which has been found to improve durability of the coating. In certain example embodiments of this invention, silicon oxynitride based (and/or silicon oxide based) layer 17 is substantially thicker (e.g., at least about 20 nm thicker, more preferably at least 30 nm thicker, and most preferably at least about 40 or 50 nm thicker) than silicon oxynitride based (and/or silicon nitride based) layer 13, in order to provide lower SHGC, improved durability, and good aesthetics. In certain example embodiments of this invention, silicon oxynitride based (and/or silicon oxide based) layer 17 is from about 5-200 nm thick, more preferably from about 40-160 nm thick, with an example thickness being about 100 nm ("about" means +/−5% herein). In certain example embodiments of this invention, silicon oxynitride based (and/or silicon nitride based) layer 13 is from about 10-80 nm thick, more preferably from about 20-40 nm thick, with an example thickness being about 30 nm.

In certain example embodiments, while both layers 13 and 17 are of or include silicon oxynitride, the layer 13 contains more nitrogen than does layer 17. For example, silicon oxynitride inclusive layer 13 may contain at least two or three times as much nitrogen as silicon oxynitride inclusive layer 17. In one example, at least one SiAl target is sputtered in an atmosphere containing approximately equal amounts of oxygen (O) and nitrogen (N) gases to deposit silicon oxynitride inclusive layer 13, whereas at least one SiAl target is sputtered in an atmosphere containing a ratio of about 95/5 of O/N gas to deposit silicon oxynitride inclusive layer 17 (Ar gas may also be provided in these atmospheres). Much less nitrogen is used in layer 17 (compared to layer 13) in order to achieve a lower refractive index for layer 17 (compared to layer 13) so that the layer 17 can be made thicker to further improve durability of the coating. Layer 17 may have a refractive index of from about 1.65 to 1.85 in certain example embodiments of this invention, more preferably from about 1.68 to 1.77, which is typically lower than the refractive index of layer 13 which may be from about 1.8 to 2.04, more preferably from about 1.86 to 2.0.

Layers 5, 13 and/or 17 may be doped with aluminum (e.g., from about 1-15% Al, more preferably from about 1-12%, or 1-5% Al) in certain instances. It will be appreciated that in alternative embodiments of this invention, other materials may be used for one or more of layers 5, 13, and/or 17. For example, FIG. 2 emphasizes that other material may be used for one or more of dielectric layers 5, 13, and/or 17 in certain example embodiments of this invention.

In the FIG. 1-2 embodiments, the low-E coating includes Ag-based IR reflecting layer 9. Silver is a good choice for the IR reflecting layer because of its high IR reflectivity and comparatively low and basically constant dispersion in the visible range. The Ag-based layer(s) in a low-E coating is typically the most sensitive layer(s). It is not stable both thermally and chemically, because the optical and electrical properties of an Ag layer 9 are easily degraded by thermal oxidation and corrosion. Silver, when exposed to moisture, degrades regarding performance due to high localized concentration(s) of contaminants in moisture such as oxygen, chlorine, sulphur, acids and bases. Damage is often visible in the form of shiny white dots. One way such coatings are damaged is due to pre-existing scratches being exposed to atmosphere. The protective overcoat described herein has shown improvement with respect to durability for better protection of the silver based layer 9 in chemical, mechanical, and environmental properties (compared to a similar coating where layers 15 and 17 are not present).

It has been found that layers 15 and 19 of or including zirconium oxide (e.g., $ZrO_2$) improve durability and can improve thermal stability if the coated article is heat treated. In certain example embodiments, the use of a pair of zirconium oxide based layers 15 and 19, separated by at least a dielectric layer 17, results in a coated article which has excellent durability and can be heat treated (e.g., thermally tempered) without suffering from significant mottling damage or other damage from heat treatment (e.g., the coated article can realize acceptable visible transmission, a* and/or b* values following optional heat treatment such as thermal tempering). In certain example embodiments, the index "n" of the zirconium oxide layer 19 is from about 2.1 to 2.25, more preferably about 2.16 (at 550 nm, as with other indices of refraction mentioned herein).

It has been found that the use of layers 15, 17 and 19 allows the resulting coated article which has a low-E coating to realize excellent chemical and mechanical durability, and also good thermal performance if desired. For example, as shown in FIGS. 1 and/or 2, testing has shown that the use of the two spaced apart zirconium oxide based layers 15 and 19 in SiN/ZrO/SiON/ZrO (layers 13/15/17/19 in a FIG. 1 embodiment, where the ZrO layers were 4 nm thick and the SiON layer was 100 nm thick) allows the resulting coated article(s) to achieve significantly improved corrosion resistance to HCl (e.g., exposure to 20% HCl; 650 C/1 hr.), finger print corrosion (coating put in damp heat with sprayed finger print solution), Salt Fog test, and scratch corrosion test before and/or after optional HT (compared to the same layer stack absent layers 15 and 17). Thus, the testing shows that a low-E coating with an overcoat of SiN/ZrO/SiON/ZrO (layers 13/15/17/19 in a FIG. 1 embodiment) provides for significantly improved mechanical and chemical durability compared to the same low-E coating with an overcoat of SiN/ZrO. The improvement in durability shown by the HCl, finger print corrosion, and Salt Fog tests was evident both before and after any optional HT, whereas the improvement in durability shown by the scratch corrosion test was evident only before any optional HT (for thermal tempering).

While FIG. 1 illustrates the coating 3 in a manner where Ag based (or Au based) layer 9 is the only Ag-based (or Au-based) IR reflecting layer in the coating, the instant invention is not so limited. Other layer(s) may be provided between layers 13 and 15 (and/or between layers 15 and 17, and/or between layers 17 and 19) in certain other embodiments of this invention. Moreover, other layer(s) (not shown) may be provided between substrate 1 and layer 5 in certain embodiments of this invention. Thus, while the coating 3 or layers thereof is/are "on" or "supported by" substrate 1 (directly or indirectly), other layer(s) may be provided therebetween. Thus, for example, the layer system 3 and layers thereof shown in FIGS. 1-2 are considered "on" the substrate 1 even when other layer(s) (not shown) are provided therebetween (i.e., the terms "on" and "supported by" as used herein are not limited to directly contacting). Also, more than one Ag-based IR reflecting layer may be provided in coating 3 in alternative embodiments of this invention.

Moreover, in different embodiments of this invention, layers 15, 17 and 19 as described herein and shown in FIGS. 1-2 (as well as the optional NbZr based layer between layers 11 and 13, and layer 13) may be provided over any of the various low-E coatings in U.S. Pat. Nos. 6,686,050, 6,749,941, 6,863,928, 7,166,359, 7,390,572, 7,462,398, 7,534,496, 7,597,962, 7,597,963, 7,655,313, 7,771,830, 7,858,191, 7,879,448, 7,897,260, 7,998,320, and/or 8,017,243, all of which are incorporated herein by reference. The precise stack of the low-E coating under the overcoat is not particularly limiting in certain example embodiments of this invention.

While FIGS. 1-2 illustrate a coated article according to an embodiment of this invention in monolithic form, coated articles according to other embodiments of this invention may comprise IG (insulating glass) window units as shown in FIG. 3. FIG. 3 illustrates an IG window unit including the coated article of FIG. 1 and/or FIG. 2. As shown in FIG. 3, the coated substrate 1 may be coupled to (after HI in certain instances) another glass substrate 20 via at least one spacer and/or seal 22 so as to form an IG window unit. The space or gap 24 between the substrates may or may not be evacuated to a pressure below atmospheric in different example embodiments. Moreover, the space or gap 24 may or may not be filled with a gas (e.g., Ar) in different embodiments of this invention. In IG embodiments, coating 3 from FIG. 1 and/or FIG. 2 may be provided on the inner wall of the outer substrate 1 of the IG unit as shown in FIG. 3, and/or on either major surface of the inner substrate 20, or in any other suitable location in other embodiments of this invention. The coating 3 may be located in similar locations in laminated window applications.

Turning back to FIGS. 1-2, various thicknesses may be used consistent with this invention. According to certain non-limiting example FIG. 1 embodiments of this invention, example thicknesses and materials for the respective layers on the glass substrate 1 are as follows in Table 4. Before and/or after heat treatment (HT) such as thermal tempering, in certain example embodiments of this invention coated articles have color characteristics below in Table 5 (monolithic). It is noted that in Table 5 subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 3 is provided.

TABLE 4

(Example non-limiting thicknesses)

| Layer | Example Range (nm) | Preferred (nm) | Best (nm) |
|---|---|---|---|
| silicon nitride (layer 5): | 5-90 nm | 30-60 nm | 45 nm |
| lower contact (layer 7): | 1-5 nm | 1-3 nm | 2 nm |
| silver (layer 9): | 3-15 nm | 4-8 nm | 6 nm |
| upper contact (layer 11): | 1-5 nm | 1-3 nm | 2 nm |
| silicon nitride (layer 13): | 10-80 nm | 20-40 nm | 30 nm |
| zirconium oxide (layer 15): | 2-12 nm | 3-8 nm | 4 or 5 nm |
| silicon oxynitride (layer 17): | 5-200 nm | 40-160 nm | 100 nm |
| zirconium oxide (layer 19): | 2-12 nm | 3-8 nm | 4 or 5 nm |

TABLE 5

Example Color/Optical Characteristics (Monolithic)

| | General | Preferred | Most Preferred |
|---|---|---|---|
| $T_{vis}$ (TY): | >=30% | 40-60% | 45-55% |
| $L^*_T$ | 68-84 | 73-79 | 74-78 |
| $a^*_T$ | +4 to −7 | 0 to −5 | −1 to −3 |
| $b^*_T$ | −10 to +12 | −3 to +8 | 0 to +5 |
| $R_G Y$(glass side): | 16-29% | 18-25% | 20-23% |
| $L^*_G$ | 46-63 | 50-58 | 53-55 |
| $a^*_G$ | −6 to +5 | −4 to +1 | −2 to 0 |
| $b^*_G$ | −10 to +20 | 0 to +10 | +2 to +4 |
| $R_F Y$(film side): | 6-20% | 6-12% | 7-9% |
| $L^*_F$ | 27-40 | 29-38 | 31-35 |
| $a^*_F$ | −5 to +10 | −1 to +6 | 0 to +4 |
| $b^*_F$ | +10 to −50 | −10 to −40 | −20 to −30 |

Color characteristics are measured and reported herein using the CIE LAB a*, b* coordinates and scale (i.e. the CIE a*b* diagram, Ill. CIE-C, 2 degree observer). The terms "emittance" and "transmittance" are well understood in the art and are used herein according to their well known meaning. Thus, for example, the terms visible light transmittance (TY), infrared radiation transmittance, and ultraviolet radiation transmittance ($T_{uv}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380-720 nm; near-infrared is 720-2500 nm; ultraviolet is 300-380 nm; and total solar is 300-2500 nm. For purposes of emittance, however, a particular infrared range (i.e. 2,500-40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

The terms "heat treatment" and "heat treating" (HT) as used herein mean heating the article to a temperature sufficient to enabling thermal tempering, bending, and/or heat strengthening of the glass inclusive article. This definition includes, for example, heating a coated article to a temperature of at least about 580 or 600 degrees C. for a sufficient period to enable tempering and/or heat strengthening. In some instances, the HT may be for at least about 4 or 5 minutes.

In certain example embodiments of this invention, there is provided a coated article including a layer system supported by a glass substrate, the layer system comprising: a first dielectric layer on the glass substrate; an IR reflecting layer comprising silver on the glass substrate over at least the first dielectric layer; a contact layer on the glass substrate over and directly contacting the IR reflecting layer; a first layer comprising zirconium oxide on the glass substrate over at least the contact layer; a second dielectric layer on the glass substrate over the first layer comprising zirconium oxide; and a second layer comprising zirconium oxide on the glass substrate over at least the second dielectric layer, wherein the second dielectric layer directly contacts at least one of the first and second layers comprising zirconium oxide.

In the coated article of the preceding paragraph, the second dielectric layer can be located between and directly contacting the first and second layers comprising zirconium oxide.

In the coated article of any of the preceding two paragraphs, it may be the case that no IR reflecting layer is located over the first and second layers comprising zirconium oxide.

In the coated article of any of the preceding three paragraphs, the second layer comprising zirconium oxide is the uppermost layer of the coating farthest from the glass substrate.

In the coated article of any of the preceding four paragraphs, there can be provided a layer comprising NbZr located over the contact layer and the IR reflecting layer and under the first layer comprising zirconium oxide. The layer comprising NbZr can be characterized by one, two, three or four of (i) the layer comprising NbZr being metallic or substantially metallic, (ii) the layer comprising NbZr being oxided, (iii) the layer comprising NbZr being from about 10-50 angstroms thick, (iv) the layer comprising NbZr containing from about 1-20% Zr (atomic %).

In the coated article of any of the preceding five paragraphs, the first dielectric layer can comprise silicon nitride.

In the coated article of any of the preceding six paragraphs, the second dielectric layer can comprise silicon nitride.

In the coated article of any of the preceding seven paragraphs, the second dielectric layer can comprise silicon oxynitride.

In the coated article of any of the preceding eight paragraphs, there can be another contact layer under and directly contacting the IR reflecting layer.

In the coated article of any of the preceding nine paragraphs, the second dielectric layer can be from about 5-200 nm thick.

In the coated article of any of the preceding ten paragraphs, the second dielectric layer can be from about 40-160 nm thick.

In the coated article of any of the preceding eleven paragraphs, there can further be a third dielectric layer located between at least the contact layer provided over the IR reflecting layer and the first layer comprising zirconium oxide. The third dielectric layer (e.g., see layer 13) can be characterized by one, two or all three of: (i) the third dielectric layer can comprise silicon oxynitride, (ii) the third dielectric layer can comprise silicon nitride, (iii) the third dielectric layer can be between and directly contacting each of the contact layer and the first layer comprising zirconium oxide.

In the coated article of any of the preceding twelve paragraphs, at least one of the first and second layers comprising zirconium oxide can be dielectric.

In the coated article of any of the preceding thirteen paragraphs, both of the first and second layers comprising zirconium oxide can be dielectric.

In the coated article of any of the preceding fourteen paragraphs, the first layer comprising zirconium oxide can comprise $ZrO_2$.

In the coated article of any of the preceding fifteen paragraphs, the second layer comprising zirconium oxide can comprise $ZrO_2$.

In the coated article of any of the preceding sixteen paragraphs, the first layer comprising zirconium oxide can be from about 2-12 nm thick, more preferably from about 3-8 nm thick, and most preferably from about 4-5 nm thick.

In the coated article of any of the preceding seventeen paragraphs, the second layer comprising zirconium oxide can be from about 2-12 nm thick, more preferably from about 3-8 nm thick, and most preferably from about 4-5 nm thick.

In the coated article of any of the preceding eighteen paragraphs, the coated article can have a visible transmission of from about 40 to 60%.

In the coated article of any of the preceding nineteen paragraphs, the coated article can be a window.

In the coated article of any of the preceding twenty paragraphs, the layer system can have a sheet resistance ($R_s$) of less than about 20 ohms/square.

In the coated article of any of the preceding twenty-one paragraphs, the layer system can contains only one silver-based IR reflecting layer.

In the coated article of any of the preceding twenty-two paragraphs, the coated article can comprises an IG window unit, a monolithic window, or a laminated window.

In the coated article of any of the preceding twenty-three paragraphs, it may be the case that the first and second layers comprising zirconium oxide, and the second dielectric layer, do not contact any IR reflecting layer comprising Ag or Au.

In the coated article of any of the preceding twenty-four paragraphs, the contact layer can comprises NiCr.

In the coated article of any of the preceding twenty-five paragraphs, the contact layer can comprise Ni and Mo.

In the coated article of any of the preceding twenty-six paragraphs, the contact layer can comprises Ni, Cr and Mo.

In certain example embodiments of this invention, there is provided a coated article including a layer system supported by a glass substrate, the layer system comprising: a first dielectric layer on the glass substrate; an IR reflecting layer comprising silver on the glass substrate over at least the first dielectric layer; a contact layer on the glass substrate over and directly contacting the IR reflecting layer; a layer comprising NbZr on the glass substrate over at least the contact layer; and an overcoat comprising first and second spaced apart layers comprising zirconium oxide on the glass substrate over at least the layer comprising NbZr.

In the coated article of the preceding paragraph, the layer comprising NbZr can directly contact the contact layer.

In the coated article of any of the preceding two paragraphs, the contact layer can comprises NiCr.

In the coated article of any of the preceding three paragraphs, the contact layer can comprise Ni and Mo.

In the coated article of any of the preceding four paragraphs, it may be the case that none of the first and second layers comprising zirconium oxide, at least one dielectric layer between the first and second layers comprising zirconium oxide, nor the layer comprising NbZr directly contact any IR reflecting layer comprising Ag or Au.

In the coated article of any of the preceding five paragraphs, a second dielectric layer can be located between and directly contacting the first and second layers comprising zirconium oxide.

In the coated article of any of the preceding six paragraphs, it may be the case that no IR reflecting layer is located over the first and second layers comprising zirconium oxide.

In the coated article of any of the preceding seven paragraphs, the second layer comprising zirconium oxide is the uppermost layer of the coating farthest from the glass substrate.

In the coated article of any of the preceding eight paragraphs, the layer comprising NbZr can be characterized by one, two, three or four of: (i) the layer comprising NbZr being metallic or substantially metallic, (ii) the layer comprising NbZr being oxided, (iii) the layer comprising NbZr being from about 10-50 angstroms thick, (iv) the layer comprising NbZr containing from about 1-20% Zr (atomic %).

In the coated article of any of the preceding nine paragraphs, the first dielectric layer can comprise silicon nitride.

In the coated article of any of the preceding ten paragraphs, a second dielectric layer of or including silicon nitride and/or silicon oxynitride can be located between the first and second layers comprising zirconium oxide. The second dielectric layer may be from about 5-200 nm thick, more preferably from about 40-160 nm thick.

In the coated article of any of the preceding eleven paragraphs, there can be another contact layer under and directly contacting the IR reflecting layer.

In the coated article of any of the preceding twelve paragraphs, there can further be a third dielectric layer located between at least the layer comprising NbZr and the first layer comprising zirconium oxide. The third dielectric layer (e.g., see layer 13) may be characterized by one, two or all three of: (i) the third dielectric layer can comprise silicon oxynitride, (ii) the third dielectric layer can comprise silicon nitride, (iii) the third dielectric layer can be between and directly contacting each of the contact layer and the first layer comprising zirconium oxide.

In the coated article of any of the preceding thirteen paragraphs, at least one of the first and second layers comprising zirconium oxide can be dielectric.

In the coated article of any of the preceding fourteen paragraphs, both of the first and second layers comprising zirconium oxide can be dielectric.

In the coated article of any of the preceding fifteen paragraphs, the first layer comprising zirconium oxide can comprise $ZrO_2$.

In the coated article of any of the preceding sixteen paragraphs, the second layer comprising zirconium oxide can comprise $ZrO_2$.

In the coated article of any of the preceding seventeen paragraphs, the first layer comprising zirconium oxide can be from about 2-12 nm thick, more preferably from about 3-8 nm thick, and most preferably from about 4-5 nm thick.

In the coated article of any of the preceding eighteen paragraphs, the second layer comprising zirconium oxide can be from about 2-12 nm thick, more preferably from about 3-8 nm thick, and most preferably from about 4-5 nm thick.

In the coated article of any of the preceding nineteen paragraphs, the coated article can have a visible transmission of from about 40 to 60%.

In the coated article of any of the preceding twenty paragraphs, the coated article can be a window.

In the coated article of any of the preceding twenty-one paragraphs, the layer system can have a sheet resistance ($R_s$) of less than about 20 ohms/square.

In the coated article of any of the preceding twenty-two paragraphs, the layer system may contain only one silver-based IR reflecting layer.

In the coated article of any of the preceding twenty-three paragraphs, the coated article can comprises an IG window unit, a monolithic window, or a laminated window.

In the coated article of any of the preceding twenty-four paragraphs, the contact layer can comprises Ni, Cr and Mo.

In certain example embodiments of this invention, there is provided a coated article including a layer system supported by a substrate, the layer system comprising: a first dielectric layer on the substrate; an IR reflecting layer on the substrate over at least the first dielectric layer; a contact layer on the substrate over and directly contacting the IR reflecting layer; a layer comprising NbZr on the substrate over and directly contacting the contact layer; another dielectric layer on the substrate over and directly contacting the layer comprising NbZr; an overcoat comprising at least one layer comprising zirconium oxide, the layer comprising zirconium oxide being over at least the another dielectric layer; and wherein no IR reflecting layer is located over the layer comprising NbZr or the layer comprising zirconium oxide.

In the coated article of the preceding paragraph, the contact layer can comprises NiCr.

In the coated article of any of the preceding two paragraphs, the coated article can have a visible transmission of from about 40 to 60%.

In the coated article of any of the preceding three paragraphs, the coated article can be a window.

In the coated article of any of the preceding four paragraphs, the layer system can have a sheet resistance ($R_s$) of less than about 20 ohms/square.

In the coated article of any of the preceding five paragraphs, the layer system may contain only one silver-based IR reflecting layer.

In the coated article of any of the preceding six paragraphs, the coated article can comprises an IG window unit, a monolithic window, or a laminated window.

In the coated article of any of the preceding seven paragraphs, the contact layer can comprises Ni, Cr and Mo.

In the coated article of any of the preceding eight paragraphs, the overcoat can comprise two spaced apart layers comprising zirconium oxide.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
    a first dielectric layer on the glass substrate;
    an IR reflecting layer comprising silver on the glass substrate over at least the first dielectric layer;
    a contact layer on the glass substrate over and directly contacting the IR reflecting layer;
    a layer comprising an oxide of NbZr located on the substrate over at least the contact layer and the IR reflecting layer;
    a first layer comprising zirconium oxide on the glass substrate over at least the contact layer, the first layer comprising zirconium oxide being located over and directly contacting the layer comprising the oxide of NbZr;
    a second dielectric layer on the glass substrate over the first layer comprising zirconium oxide; and
    a second layer comprising zirconium oxide on the glass substrate over at least the second dielectric layer;
    wherein the second dielectric layer directly contacts at least one of the first and second layers comprising zirconium oxide.

2. The coated article of claim 1, wherein the second dielectric layer is located between and directly contacting both the first and second layers comprising zirconium oxide.

3. The coated article of claim 1, wherein no IR reflecting layer is located over the first and second layers comprising zirconium oxide.

4. The coated article of claim 1, wherein the second layer comprising zirconium oxide is the uppermost layer of the coating farthest from the glass substrate.

5. The coated article of claim 1, wherein the layer comprising NbZr is located over and directly contacting the contact layer.

6. The coated article of claim 1, wherein the layer comprising NbZr is from about 10-50 angstroms thick.

7. The coated article of claim 1, wherein the layer comprising NbZr contains from about 1-20% Zr (atomic %).

8. The coated article of claim 1, wherein the first dielectric layer comprises silicon nitride.

9. The coated article of claim 1, wherein the second dielectric layer comprises silicon nitride.

10. The coated article of claim 1, wherein the second dielectric layer comprises silicon oxynitride.

11. The coated article of claim 1, further comprising another contact layer under and directly contacting the IR reflecting layer.

12. The coated article of claim 1, wherein the second dielectric layer is from about 5-200 nm thick.

13. The coated article of claim 1, wherein the second dielectric layer is from about 40-160 nm thick.

14. The coated article of claim 1, further comprising a third dielectric layer located between at least the contact layer and the first layer comprising zirconium oxide.

15. The coated article of claim 14, wherein the third dielectric layer comprises silicon oxynitride.

16. The coated article of claim 1, where at least one of the first and second layers comprising zirconium oxide is dielectric.

17. The coated article of claim 1, wherein at least one of the first and second layers comprising zirconium oxide comprises $ZrO_2$.

18. The coated article of claim 1, wherein the first layer comprising zirconium oxide is from about 2-12 nm thick.

19. The coated article of claim 1, wherein the first layer comprising zirconium oxide is from about 3-8 nm thick.

20. The coated article of claim 1, wherein the second layer comprising zirconium oxide is from about 2-12 nm thick.

21. The coated article of claim 1, wherein the coated article has a visible transmission of from about 40 to 60%.

22. The coated article of claim 1, wherein the coated article is a window.

23. The coated article of claim 1, wherein the layer system has a sheet resistance ($R_s$) of less than about 20 ohms/square.

24. The coated article of claim 1, wherein the layer system contains only one silver-based IR reflecting layer.

25. The coated article of claim 1, wherein the first and second layers comprising zirconium oxide, and the second dielectric layer, do not contact any IR reflecting layer comprising Ag or Au.

26. The coated article of claim 1, wherein the contact layer comprises NiCr.

27. The coated article of claim 1, wherein the contact layer comprises Ni and Mo.

28. The coated article of claim 1, wherein the contact layer comprises Ni, Cr and Mo.

* * * * *